March 18, 1958 — C. W. ELMORE — 2,827,187
BOAT TRAILER WITH RAISING AND LOWERING MEANS
Filed May 8, 1957 — 2 Sheets-Sheet 1
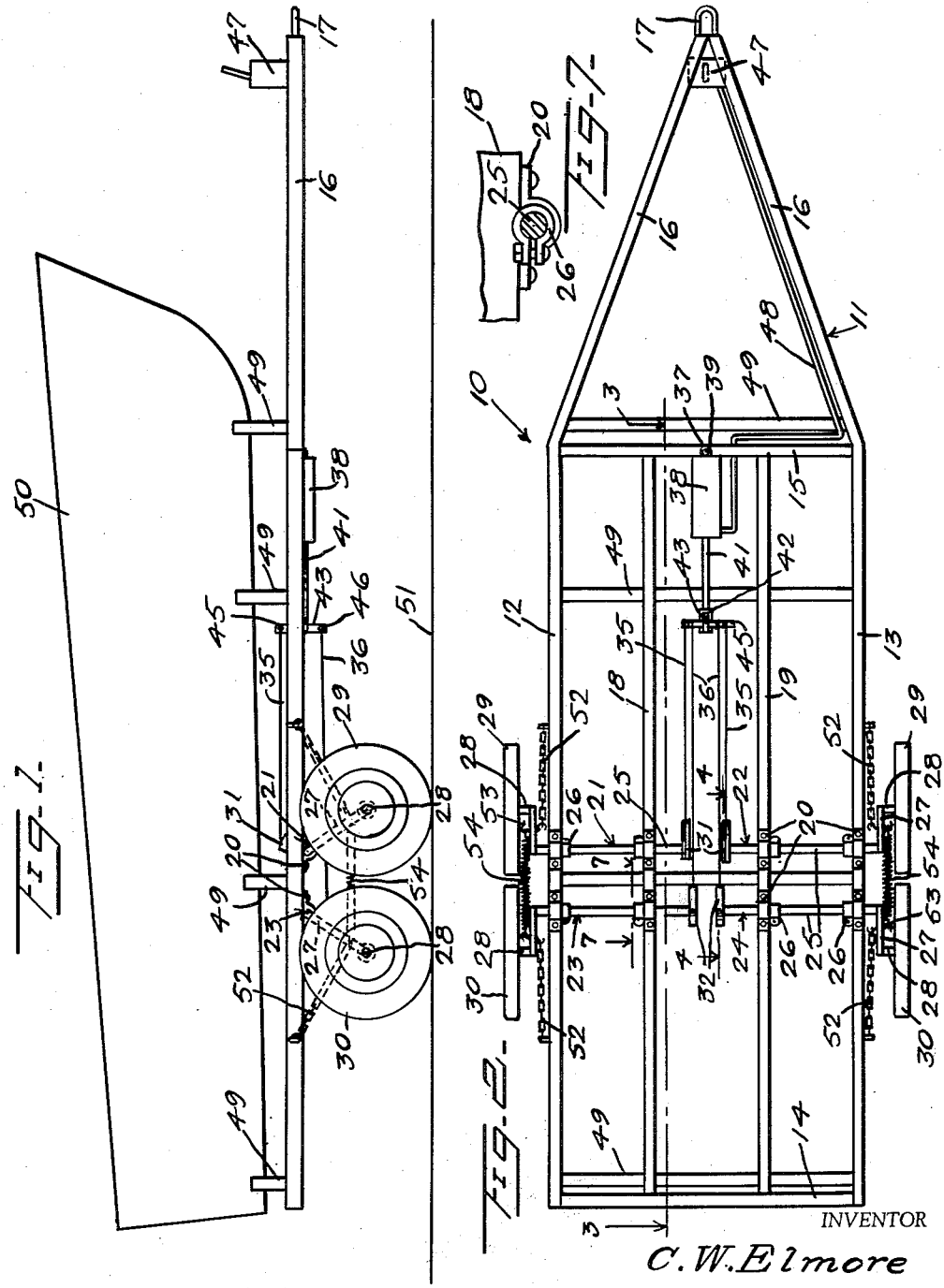
INVENTOR
C. W. Elmore
BY John N. Randolph
ATTORNEY

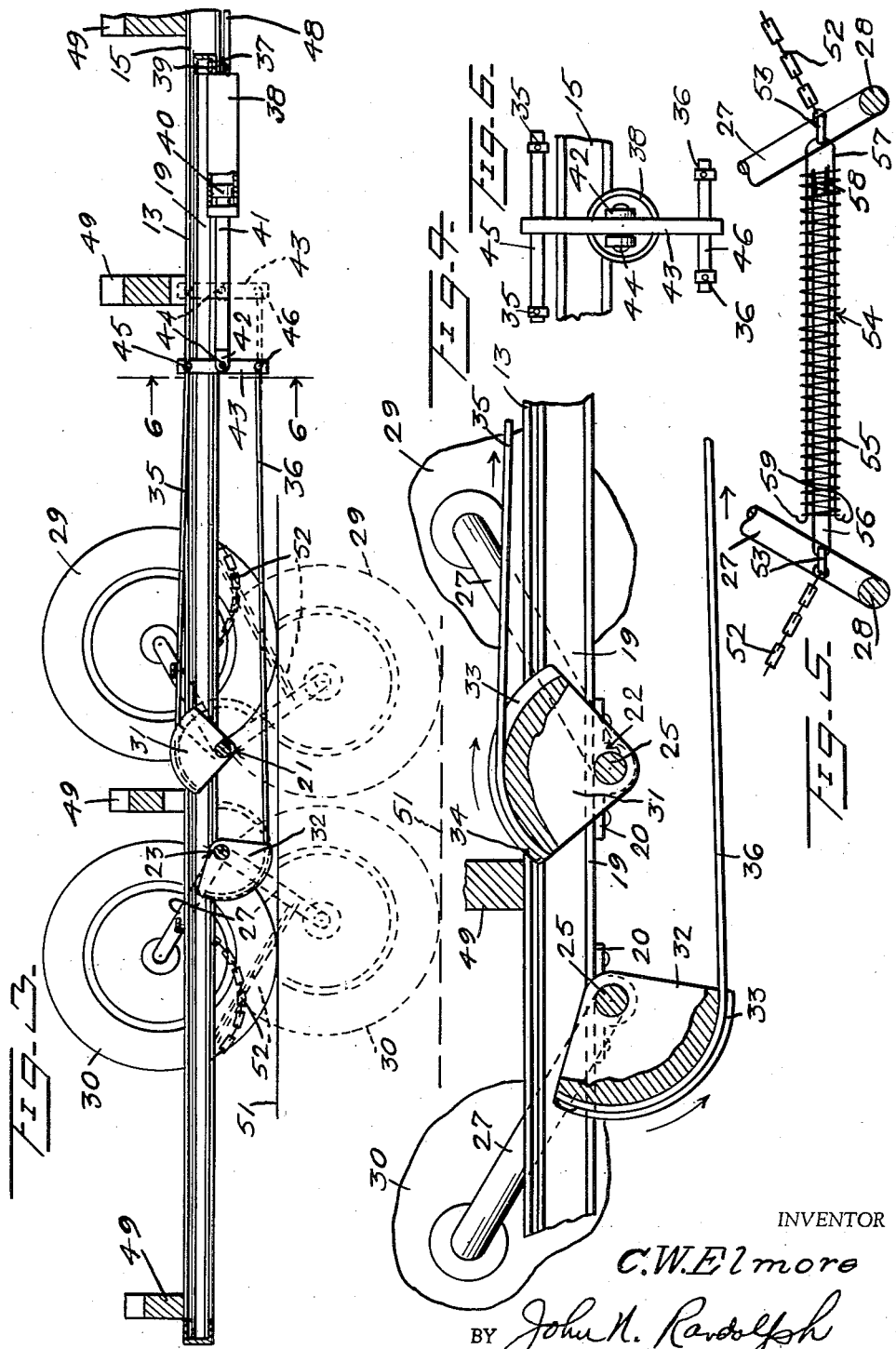

United States Patent Office 2,827,187
Patented Mar. 18, 1958

2,827,187

BOAT TRAILER WITH RAISING AND LOWERING MEANS

Charles W. Elmore, Greybull, Wyo.

Application May 8, 1957, Serial No. 657,824

6 Claims. (Cl. 214—505)

This invention relates to a novel boat trailer having means connecting the trailer frame to the trailer wheels and by which the frame can be raised and lowered relative to the wheels.

More particularly, it is an aim of the present invention to provide a boat trailer from which a boat can be readily floated and thus launched into the water by lowering the boat trailer frame; and onto which a boat, which is afloat, can be readily loaded by raising the trailer while positioned beneath the boat.

A further object of the invention is to provide a trailer having novel means for raising and lowering the trailer frame including equalizer means to vary the extent that axles of the wheels are swingably moved relative to the frame to enable the trailer frame to be raised and lowered either when attached to or detached from a draft vehicle.

A further object of the invention is to provide a trailer having a novel spring suspension for yieldably supporting the trailer frame relative to the ground wheels when the frame is in a raised, load conveying position.

Various other objects and advantages of the invention will hereinafter become more fully apparent from the following description of the drawings, illustrating a presently preferred embodiment thereof, and wherein:

Figure 1 is a side elevational view of the trailer shown in a raised, load conveying position;

Figure 2 is a bottom plan view of the trailer;

Figure 3 is a longitudinal sectional view of a portion of the trailer, on an enlarged scale, taken substantially along a plane as indicated by the line 3—3 of Figure 2, and showing the trailer frame in a lowered position;

Figure 4 is an enlarged fragmentary longitudinal sectional view, taken substantially along the line 4—4 of Figure 2, and illustrating the positions of certain of the parts with the frame in a lowered position;

Figure 5 is a fragmentary longitudinal sectional view, on an enlarged scale, showing details of the structures associated with the axle cranks;

Figure 6 is an enlarged fragmentary cross sectional view, taken substantially along a plane as indicated by the line 6—6 of Figure 3, and Figure 7 is an enlarged fragmentary detailed sectional view, taken substantially along a plane as indicated by the line 7—7 of Figure 2.

Referring more specifically to the drawings, the boat trailer in its entirety is designated generally 10 and includes an elongated frame, designated generally 11, having laterally spaced substantially parallel sides 12 and 13, a rear cross member 14, which extends between and is connected to rear ends of the frame sides 12 and 13, and a front cross member 15 which extends between and is connected to the forward ends of the sides 12 and 13. Said sides 12 and 13, beyond the front cross member 15, are provided with corresponding forwardly converging frame portions 16 which merge with one another at their forward ends and which form the trailer tongue. A coupling eye 17 is secured to and extends from the forward ends of the frame members 16. The frame 11 also includes inner longitudinal frame members 18 and 19 which are disposed between and spaced from the frame sides 12 and 13 and which have their ends secured to the cross members 14 and 15. The frame members 12 to 16, 18 and 19 are preferably formed of channel iron, as seen in Figures 3, 4 and 6.

Two bearing members 20 are secured to the underside of each of the frame members 12, 13, 18 and 19, and the bearing members secured to said frame members are disposed in alignment with one another, as seen in Figure 2. Four axles 21, 22, 23 and 24 are provided, each of which includes a straight portion 25 which is journalled in two of the bearings 20, and the axle portions 25 of the two front axles 21 and 22 are disposed in alignment with one another. The axle portion 25 of the axle 21 is journalled in bearings 20 which are supported by the frame members 12 and 18 and the axle portion 25 of the axle 22 is journalled in bearings 20 which are supported by the frame members 13 and 19. The axle portions 25 of the two rear axles 23 and 24 are likewise disposed in alignment with one another and are each journalled in a pair of bearings and are disposed behind the axle portions 25 of the front axles 21 and 22, respectively. Collars 26 are detachably clamped to the shaft portions 25 and bear against the inner sides of the two bearings 20 in which each of said shaft portions is journalled to prevent sliding movement of the axles relative to the bearings. Each axle has a laterally extending crank 27 which extends laterally from the outer end of the axle portion 25 thereof. The cranks 27 of the axles 21 and 23 are spaced outwardly from the frame side 12 and the cranks 27 of the axles 22 and 24 are spaced outwardly from the frame side 13, as seen in Figure 2. Each axle crank 27 has an outwardly extending stub axle 28 located adjacent the outer end thereof, so that said stub axles are eccentrically disposed relative to the axle portions 25. A pair of front wheels 29 are journalled on the stub axles 28 of the front axles 21 and 22 and a pair of rear wheels 30 are journalled on the stub axles 28 of the rear axles 23 and 24.

A segment shaped member 31 is secured to the inner end of each axle portion 25 of the front axles 21 and 22. Said segment shaped members 31 are disposed between the frame members 18 and 19 in spaced apart relation to one another. A pair of segment shaped members 32 are fixed, one to the inner end of each rear axle portion 25. The rear segment members 32 are likewise disposed between the frame members 18 and 19 and in spaced relation to one another but are disposed in closer proximity to one another than the segment members 31, as seen in Figure 2. Each of the segments 31 and 32 has an arcuate periphery constituting substantially a quadrant and which is longitudinally grooved, as seen at 33 in Figure 4. When the axle cranks 27 are in raised positions inclined upwardly from the axle portions 25 with the front and rear axle cranks extending away from one another, as seen in full lines in Figure 3 and in Figure 4, the segments 31 of the front axles are disposed above the axle portions 25 thereof and the segments 32 extend rearwardly and downwardly with respect to the rear axle portions 25. A cable or other nonelastic flexible member is anchored at an end thereof by a fastening element 34 in the end of the groove 33 of each segment 31 and 32 and at the end of the groove 33 which is located in a rearmost position, when the axle cranks are in raised positions. The flexible members or cables 35 which are anchored to the front segments 31 extend forwardly therefrom and have portions thereof seated in the grooves 33 of said segments, and the cables 36 of the rear segments 32 extend from their anchoring fastenings 34 downwardly around the grooves 33 of said rear segments and thence forwardly therefrom.

A lug or ear 37 projects from the closed forward end of a hydraulic cylinder 38 and is secured by a fastening 39 to the underside of the front cross frame member 15 for supporting the cylinder 38 which extends rearwardly from the frame member 15. A piston 40 is slidably mounted in the cylinder 38 and has a piston rod 41 extending slidably through the rear end of the cylinder 38. The piston rod 41 has a bifurcated rear end 42 in which an intermediate portion of a bar 43 is disposed. Said intermediate portion of the bar 43 is swingably connected to the piston rod 41 by a pivot pin 44 which extends through the bifurcated portion 42 and loosely through the intermediate portion of the bar 43. The bar 43 is disposed vertically, as seen in Figures 3 and 6, and has an upper cross rod 45 extending through and connected to the upper portion thereof and a lower cross rod 46, extending through and connected to the lower portion thereof. The cross rods 45 and 46 are connected intermediate of their ends to the bar 43. The opposite, forward ends of the flexible members 35 are secured to the end portions of the upper cross rod 45 and the opposite, forward ends of the lower flexible members 36 are secured to the end portions of the lower cross rod 46. The lower cross rod 46 is preferably shorter than the upper cross rod and the spacing between the lower cable ends 36 which are connected to the lower cross rod 46 is less than the spacing between the ends of the cables 35 which are connected to the upper cross rod 45 so that the cables 35 and 36 will extend in straight lines parallel to one another between said cross rods and the segments to which the rear ends of the cables are anchored, as seen in Figure 2, to eliminate any risk of fouling of the cables. The pivotally mounted bar 43 and the cross rods 45 and 46 supported thereby form an equalizer, as will hereinafter become apparent.

A suitable hydraulic pump 47 is mounted on the merging forward ends of the frame members 16 and a tube 48 leads from the pump 47 and opens into the cylinder 38, near its rear end and behind the piston 40.

Longitudinally spaced transversely extending cradle members 49 may be mounted on and suitably secured to the upper side of the frame 11. The cradle members 49 have upper surfaces which are grooved or recessed to conformably engage the bottom of the hull of a boat 50 which rests thereon and which is thus supported by the trailer 10.

The weight of the trailer frame will tend to cause the axle cranks 27 to swing upwardly from their downwardly inclined positions of Figure 1 to their upwardly inclined positions as seen in full lines in Figure 3 and in Figure 4, to permit the trailer frame 11 to be lowered relative to the wheels 29 and 30, and relative to a surface 51 on which said wheels are supported. With the trailer frame 11 in a lowered position, as seen in Figure 3, it will be readily apparent that the boat 50 can be conveniently loaded thereon or unloaded therefrom. Also, the trailer 10 may be backed into a body of water and the frame 11 lowered for floating the boat 50 from the trailer, and the boat may be mounted on the trailer by lowering and submerging the frame 11, after which the boat is floated into a position above the frame and the frame thereafter raised for elevating the boat and to cause the boat to assume a position supported on the trailer.

As previously stated, the trailer frame will assume a lowered position due to its weight. To elevate the trailer frame a fluid medium under pressure is supplied to cylinder 38 through the conduit 48 from the pump 47 for forcibly moving the piston 40 in a forward direction so that the piston rod 41 and the equalizer 43, 45, 46 will be moved forwardly or from left to right of Figures 1, 2 and 3 to exert forward pulls on the flexible members 35 and 36. When this occurs, the segments 31 and 32 will be swung forwardly from their positions of Figure 4 to their full line positions of Figure 3. As the wheels 29 and 30 are resting on the surface 51 and which will prevent said wheels and the axle cranks 27 from swinging downwardly, the trailer frame 11 will be elevated to permit the axle cranks 27 to swingably move from their full line to their dotted line positions of Figure 3. During this movement the front wheels 29 and rear wheels 30 will initially move slightly away from one another and will thereafter move toward one another as the axle cranks 27 approach their dotted line positions beneath the frame 11 and with the cranks of the front and rear axles inclined downwardly and away from one another.

Chains or other nonelastic flexible members 52 are secured to the frame sides 12 and 13 and to the axle cranks 27 to limit swinging movement of the cranks of the front and rear axles toward one another, when the cranks are in depending positions relative to the frame, so that said cranks cannot swing sufficiently toward one another to permit the aligned front wheels 29 and rear wheels 30 to make contact with one another. The axle cranks 27 are each provided with a hook 53, located near the outer end thereof. The hooks 53 of the longitudinally aligned axle cranks 27 are connected by a spring suspension unit, designated generally 54, when the axle cranks are in downwardly inclined positions relative to the trailer frame 11, as illustrated in Figures 1, 2 and 5. Each spring suspension unit 54 includes a compression spring 55 through which two looped wires or rods 56 and 57 extend in opposite directions. Said wires or rods have outturned terminals forming hooks 58 and 59, respectively. The hooks 58 engage one end of the spring 55 and the hooks 59 engage the opposite end thereof. The looped intermediate portion of the rod 56 extends from the end of the spring 55 engaged by the hooks 59 and detachably engages one of the axle crank hooks 53, and the looped intermediate portion of the rod 57 projects from the opposite end of the spring 55 and engages the other hook 53. The spring unit 54 thus functions to prevent the axle cranks 27 to which said unit 54 is connected from swinging outwardly and upwardly away from one another sufficiently to assume raised positions of said cranks as seen in Figure 4, so that hydraulic pressure does not have to be maintained in the cylinder 38 when the spring suspension units 54 are applied, and said units will provide cushioning springs for yieldably supporting the frame 11 relative to the stub axles 28. When it is desired to lower the frame 11, pressure is supplied to the cylinder 38 after which the spring units 54 are disconnected. Pressure in the cylinder 38 can then be permitted to diminish gradually so that the frame 11 can be gradually lowered from its raised position to its lowered full line position, as seen in Figure 3.

The raising and lowering of the frame 11 has been heretofore described as it would occur with the trailer disconnected from a draft vehicle. Assuming that the coupling eye 17 was attached to a draft hitch secured to an automobile bumper, for example, under such conditions the forward end of the frame 11 could not be lowered and the frame would have to swing downwardly. Under such circumstances, the rear wheels 30 must assume more elevated positions relative to the frame than the front wheels 29 when the frame is lowered, since the frame will be inclined downwardly toward its rear end. This is provided for by the equalizer bar 43, which bar will be rocked clockwise as seen in Figure 3 about its pivot 44 to slack off the cables 36 relative to the cables 35, so that the rear axles 23 and 24 and the segments 32 thereof will be permitted to swing to a greater extent relative to the frame 11 than the front axles 21 and 22 and their segments 31 as the frame 11 swings downwardly to a lowered position. In a like manner, the rear axles will turn more rapidly than the front axles as the equalizer is pulled forwardly due to pressurizing the hydraulic ram, for levelling the frame 11 as it is swung upwardly to its raised position as seen in Figure 1.

The disposition of the wheels 29 and 30 relative to the ends of the frame 11 and the spacing between the front wheels 29 and rear wheels 30 and between the front axles 21 and 22 and rear axles 23 and 24 may be varied, if desired, to provide a more stable support for the trailer frame when disconnected from a draft vehicle, and so that the trailer may, if desired, be disconnected from its draft vehicle and backed into a body of water for unloading the boat 50 therefrom or for loading the boat thereon and may be pulled by a rope or chain connection between the coupling eye 17 and the draft vehicle for pulling the trailer from a body of water.

Various modifications and changes are contemplated and may be resorted to, without departing from the function or scope of the invention as hereinafter defined by the appended claims.

I claim as my invention:

1. A trailer of the character described comprising an elongated frame having a forward end and a rear end, a pair of front axles and a pair of rear axles, each of said axles having an inner axle portion rotatably connected to the frame, a stub shaft and a crank eccentrically mounting the stub shaft relative to said inner axle portion, said axle portions being disposed transversely of the frame and said axle cranks and stub shafts being spaced outwardly from longitudinal sides of the frame, wheels journalled on said stub shafts and adapted to engage a supporting surface for supporting the trailer frame, a segment member fixed to the inner end of each inner axle portion, said segment members having arcuate peripheral portions radially spaced from the axes of said inner axle portions, a nonelastic flexible element having an end connected to the periphery of each of said segment members, a fluid pressure responsive ram secured to the frame forwardly of the axles including a fluid pressure responsive element disposed for movement longitudinally of the frame in a direction away from the axles when the ram is pressurized, said flexible elements extending forwardly from the peripheries of said segment members, and means connected to said fluid pressure responsive element and to which the forward ends of said flexible elements are connected whereby a forward pull is exerted on said flexible elements when the fluid pressure responsive element is moved forwardly of the frame, said segment members being arranged relative to the axles and to said flexible elements for turning the front and rear axles in opposite directions simultaneously when a forward pull is exerted on the flexible elements whereby the cranks will be swung in directions relative to the frame for elevating the frame and for positioning the cranks of the front and rear axles in downwardly diverging relation to one another from the frame for supporting the frame in an elevated position, said cranks of the front and rear axles swinging away from one another toward and beyond horizontal positions, when the ram is depressurized, to allow said frame to assume a lowered position relative to the axle cranks and wheels for loading and unloading the trailer.

2. A trailer as in claim 1, and spring units detachably connectable to complementary front and rear axle cranks when the frame is in an elevated position and yieldably resisting swinging movement of said axle cranks away from one another when the ram is depressurized for resiliently supporting the frame relative to the stub axles in an elevated position of said frame.

3. A trailer as in claim 2, and means detachably connecting the frame and axle cranks for limiting swinging movement of the axle cranks toward one another when the frame is disposed in an elevated position.

4. A trailer as in claim 1, the peripheral portions of said segment members being longitudinally grooved for retaining portions of the flexible elements in engagement therewith, said flexible elements extending from the segments of the rear axles below the level of the inner end portions of said rear axles and from the segments of said front axles above the level of the inner axle portions thereof.

5. A trailer as in claim 4, said segment members of the rear axles being spaced a lesser distance apart than the segment members of the front axles.

6. A trailer as in claim 1, said means connecting the flexible elements to the fluid pressure responsive element of the ram comprising an equalizer, said equalizer including a bar pivotally connected intermediate of its ends to said fluid pressure responsive element and having means at one end thereof to which said flexible elements of the front axles are connected and means at the opposite end thereof to which the flexible elements of the rear axles are connected whereby said axles may rotate at different speeds for raising and lowering the frame to permit raising and lowering of the frame while the forward end thereof is coupled.

No references cited.